(12) United States Patent
Ushinohama

(10) Patent No.: US 11,979,538 B2
(45) Date of Patent: May 7, 2024

(54) INFORMATION PROCESSING APPARATUS IN COMMUNICATION WITH IMAGE PROCESSING APPARATUS WITH CHAT SERVICE, CONTROL METHOD AND STORAGE MEDIUM THEREFOR

(71) Applicant: CANON KABUSHIKI KAISHA, Tokyo (JP)

(72) Inventor: Takuya Ushinohama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/817,605

(22) Filed: Aug. 4, 2022

(65) Prior Publication Data

US 2023/0056034 A1 Feb. 23, 2023

(30) Foreign Application Priority Data

Aug. 20, 2021 (JP) ................. 2021-134623

(51) Int. Cl.
*H04N 1/00* (2006.01)
*G06F 3/12* (2006.01)
*H04N 1/32* (2006.01)

(52) U.S. Cl.
CPC ....... *H04N 1/32379* (2013.01); *G06F 3/1206* (2013.01); *G06F 3/1258* (2013.01); *G06F 3/1286* (2013.01); *H04N 1/00225* (2013.01); *H04N 1/00228* (2013.01); *H04N 1/00233* (2013.01); *H04N 2201/0046* (2013.01); *H04N 2201/0094* (2013.01)

(58) Field of Classification Search
CPC ........... H04N 1/32379; H04N 1/00225; H04N 1/00228; H04N 1/00233; H04N 2201/0046; H04N 2201/0094; H04N 21/4788; G06F 3/1206; G06F 3/1258; G06F 3/1286; H04L 41/5093; H04L 41/026; H04L 12/1813
See application file for complete search history.

(56) References Cited

U.S. PATENT DOCUMENTS

| | | | |
|---|---|---|---|
| 11,132,154 B2* | 9/2021 | Tomihisa | G06F 3/1204 |
| 2014/0258905 A1* | 9/2014 | Lee | G06F 3/0486 |
| | | | 715/770 |
| 2016/0050263 A1* | 2/2016 | Hwang | H04L 69/04 |
| | | | 709/204 |
| 2018/0337994 A1* | 11/2018 | Dachille | H04L 67/1097 |
| 2020/0280641 A1* | 9/2020 | Hiramatsu | G06F 3/127 |
| 2021/0144266 A1* | 5/2021 | Tsukada | H04N 1/00244 |
| 2021/0294912 A1* | 9/2021 | Tsumemitsu | G06F 3/14 |
| 2021/0409558 A1* | 12/2021 | Tsukada | H04N 1/00233 |
| 2022/0019945 A1* | 1/2022 | Norota | G06Q 10/02 |

FOREIGN PATENT DOCUMENTS

JP 2021078084 A 5/2021

* cited by examiner

*Primary Examiner* — Juan M Guillermety
(74) *Attorney, Agent, or Firm* — Canon U.S.A., Inc. IP Division

(57) ABSTRACT

An information processing apparatus that communicates with an image processing apparatus and provides a chat service includes a communication unit that receives image data generated by the image processing apparatus reading an image on a document, an acquisition unit that acquires information for identifying a storage location where the received image data is to be stored, a storage unit that stores the received image data in the storage location based on the acquired information, and a control unit that controls the acquired information to be displayed in a talk room of the chat service.

9 Claims, 13 Drawing Sheets

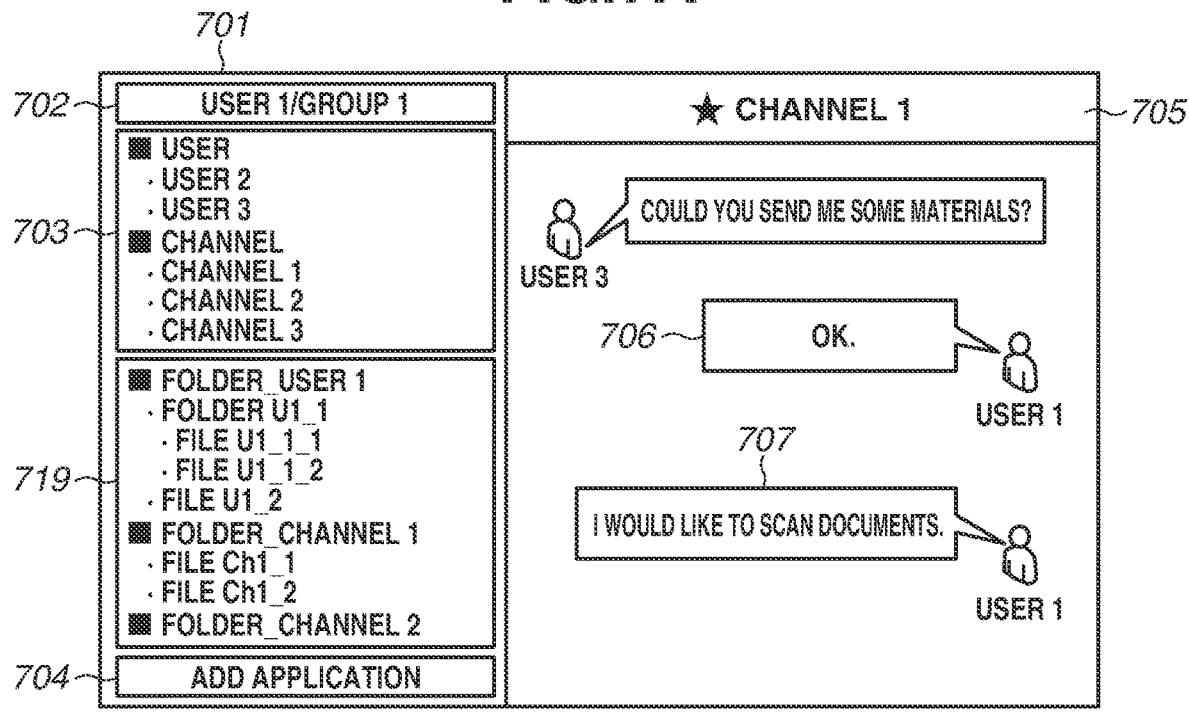

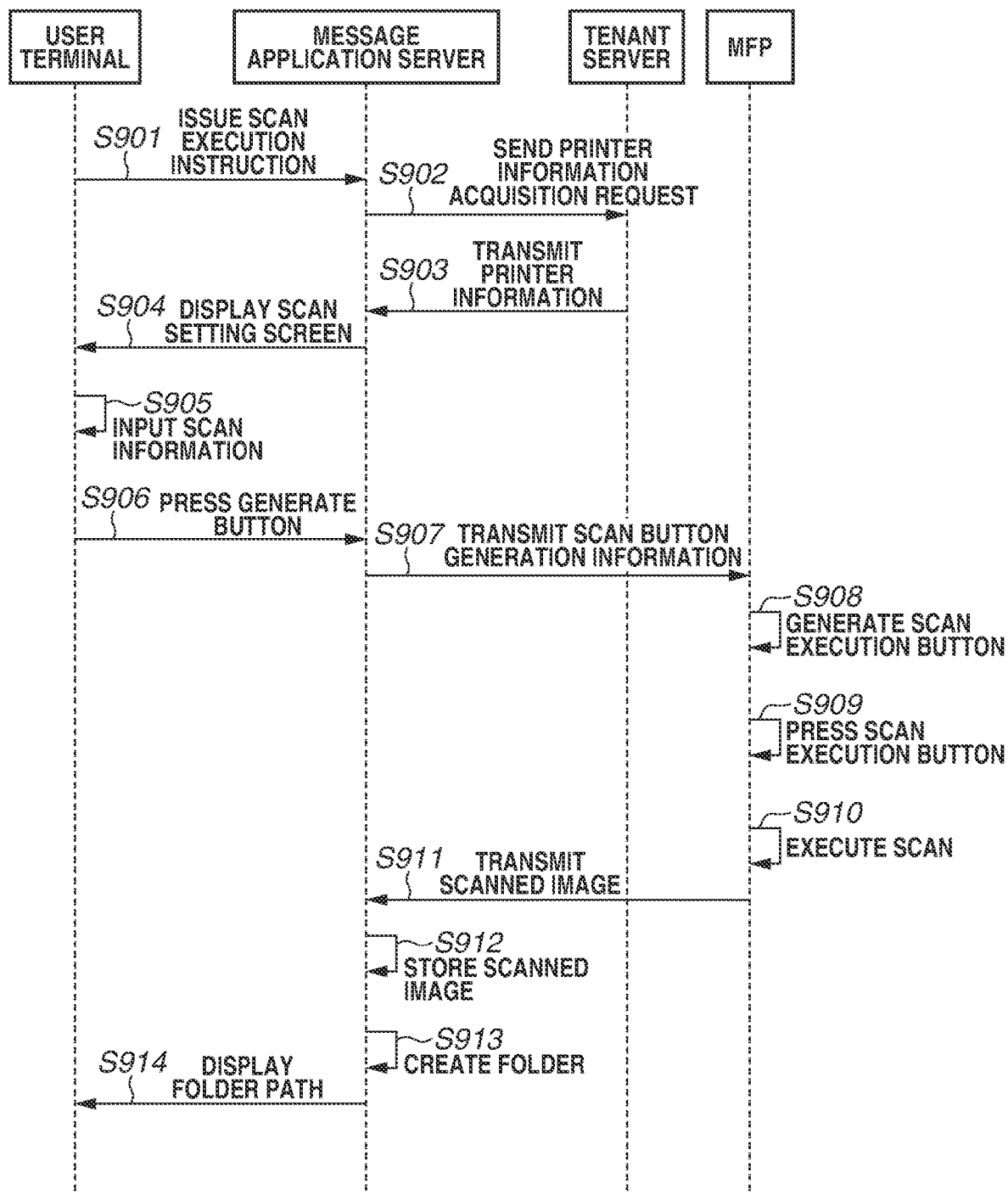

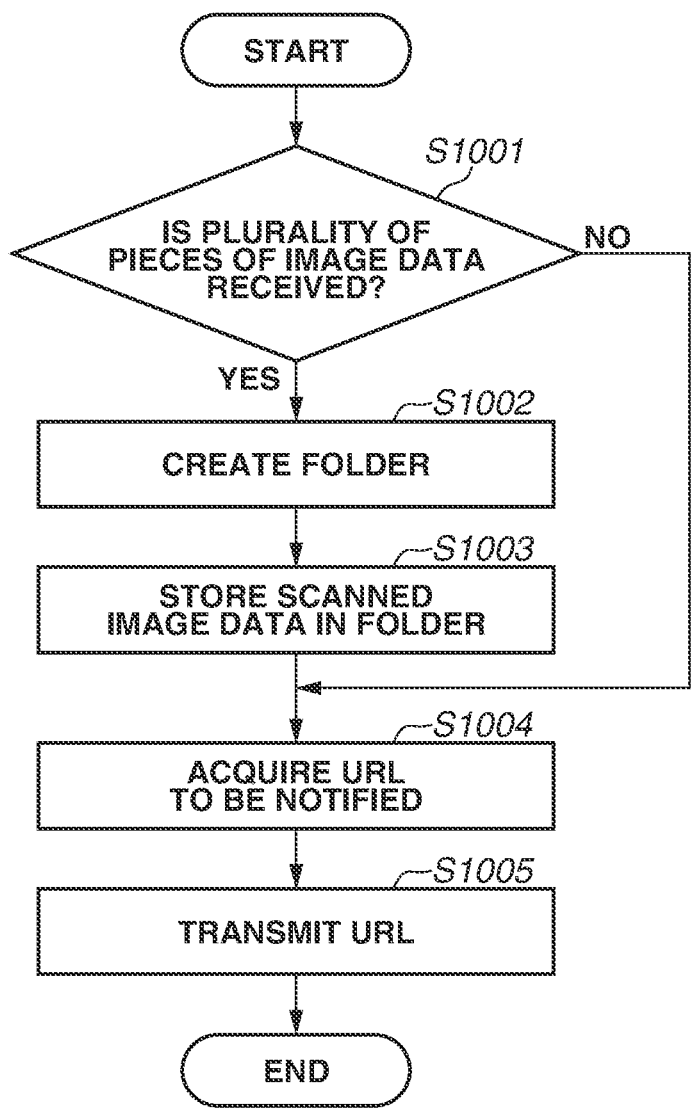

FIG.11A
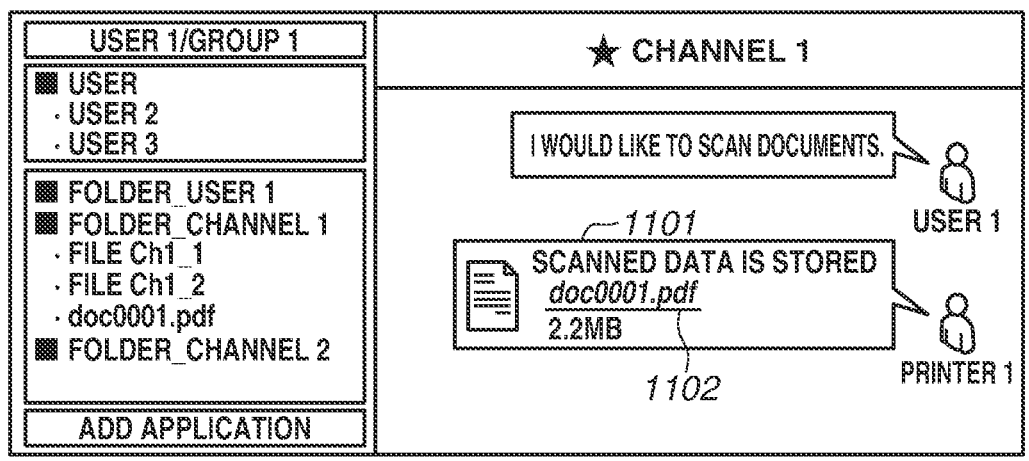
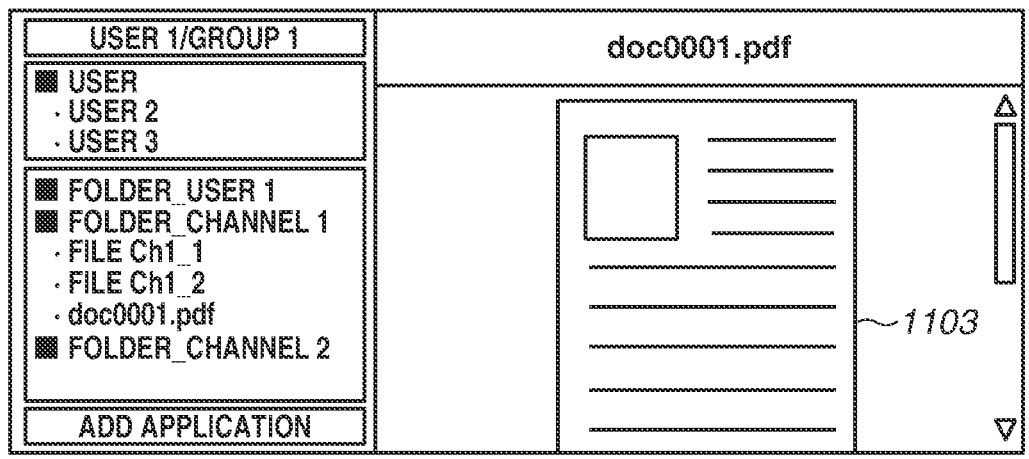

FIG.11B
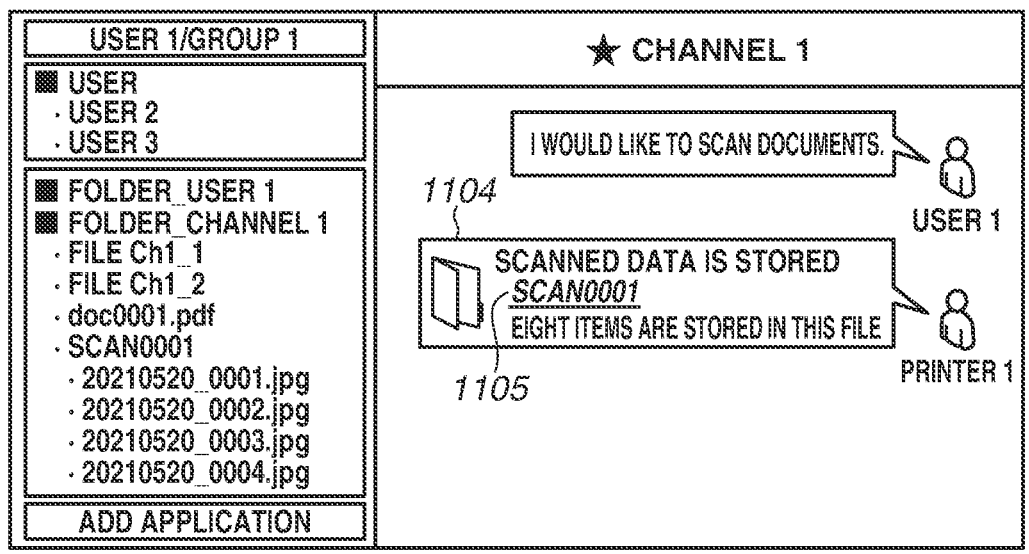
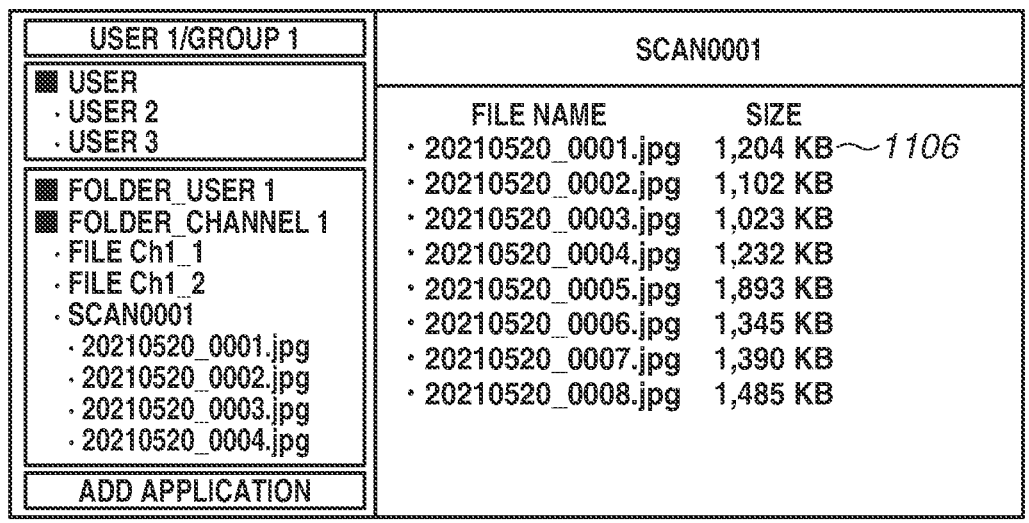

INFORMATION PROCESSING APPARATUS IN COMMUNICATION WITH IMAGE PROCESSING APPARATUS WITH CHAT SERVICE, CONTROL METHOD AND STORAGE MEDIUM THEREFOR

BACKGROUND

Field

The present disclosure relates to an information processing apparatus, a method for controlling an information processing apparatus, and a storage medium.

Description of the Related Art

Japanese Patent Application Laid-Open No. 2021-78084 discusses a technique in which an image processing apparatus scans an image on a document and transmits generated image data to a chat server that provides a chat service. With this technique, image data is uploaded to and shared in a talk room provided by the chat service.

According to Japanese Patent Application Laid-Open No. 2021-78084, the image data transmitted from the image processing apparatus is uploaded to the talk room and is assumed to be stored in a folder such as a folder managed by the chat service. Even if the image data has been stored in such a folder, however, a user in the talk room is unable to check if the image data has been stored. Accordingly, in the case where the image data transmitted from the image processing apparatus is stored in a folder, the user who is referring to the talk room has no way of knowing in which folder the desired image data has been stored.

SUMMARY

The present disclosure is directed to enabling a user to easily refer to a folder in which image data transmitted from an image processing apparatus is stored.

According to an aspect of the present disclosure, an information processing apparatus configured to communicate with an image processing apparatus and provide a chat service includes a communication unit configured to receive image data generated by the image processing apparatus reading an image on a document, an acquisition unit configured to acquire information for identifying a storage location where the image data received by the communication unit is to be stored, a storage unit configured to store the image data received by the communication unit in the storage location based on the information acquired by the acquisition unit, and a control unit configured to control the information acquired by the acquisition unit to be displayed in a talk room of the chat service.

Further features will become apparent from the following description of exemplary embodiments with reference to the attached drawings.

BRIEF DESCRIPTION OF THE DRAWINGS

FIGS. 7A and 7B illustrate examples of a screen displayed on an operation panel of the user terminal by a message application cooperating with a chatbot application.

FIG. 9 is a sequence diagram illustrating an example of scan processing and path notification processing.

FIG. 10 is a flowchart illustrating an example of folder path notification processing.

FIGS. 11A and 11B illustrate screens displayed on the operation panel of the user terminal by the message application when a notification about a uniform resource locator (URL) is provided.

DESCRIPTION OF THE EMBODIMENTS

Exemplary embodiments will be described in detail below with reference to the drawings. The following exemplary embodiments are not intended to be limiting, and not all combinations of features described in the exemplary embodiments are required to implement the features of the present disclosure.

A first exemplary embodiment will now be described. A multifunction peripheral (MFP) 10 having a printing function, a scanning function, and a facsimile (FAX) function will be described as an example of an image processing apparatus according to the present exemplary embodiment.

Figure 1:
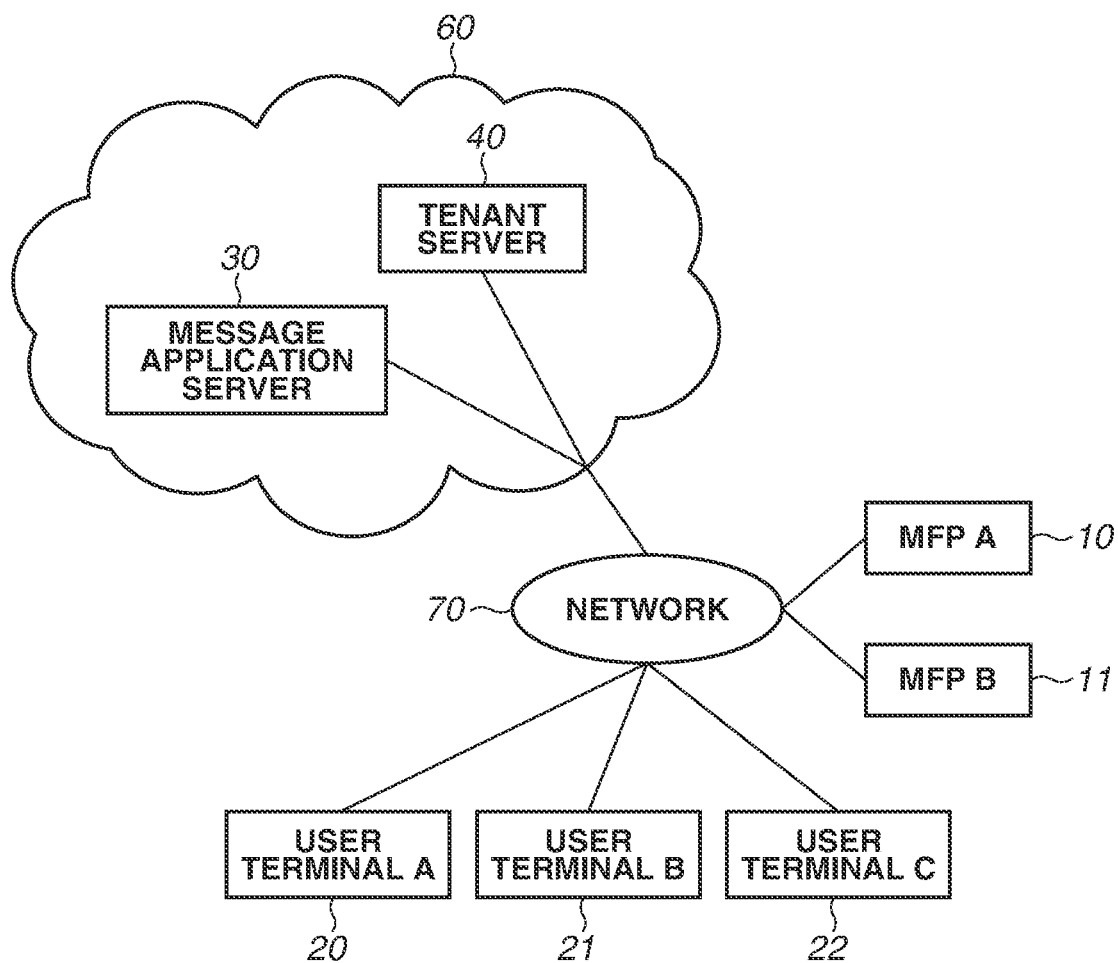
FIG. 1 illustrates an example of a configuration of a message application service according to a first exemplary embodiment.

FIG. 1 illustrates an example of a configuration of a message application service according to the present exemplary embodiment. The message application service includes an MFP A 10 and an MFP B 11, each serving as the image processing apparatus, a user terminal A 20, a user terminal B 21, a user terminal C 22, a message application server 30, and a tenant server 40. The message application server 30 and the tenant server 40 are considered cloud 60 devices. The MFP A 10 and MFP B 11, the user terminal A 20, user terminal B 21, and user terminal C 22, the message application server 30, and the tenant server 40 communicate with each other via a network 70. The network 70 is a wireless or wired network composed of a wide area network (WAN) or a local area network (LAN).

The MFP A 10 and MFP B 11 each have a function for printing images provided from the message application server 30, or a function for reading an image on a document and transmitting generated image data to the message application server 30, which is an example of an information processing apparatus. While FIG. 1 illustrates an example with two MFPs, any number of MFPs that would enable implementation of the present embodiment is applicable. The MFP A 10 and MFP B 11 have the same configuration, as such, for description purposes, only MFP A 10 will be described/referenced below.

The user terminal A 20, user terminal B 21, and user terminal C 22 are information terminals such as a smartphone, a tablet terminal, or a personal computer (PC) that are used by users of the message application service. While FIG. 1 illustrates an example with three user terminals, any number of user terminals that would enable implementation of the present embodiment is applicable. The user operates any one of the user terminal A 20, user terminal B 21, or user terminal C 22 to access the message application server 30, and exchanges messages with another user or executes an installed application. In the present exemplary embodiment, a public connection on the Internet is used as an example of the communication network. In another exemplary embodiment, a secure connection is used.

The user terminal A 20, user terminal B 21, and user terminal C 22 can have the same configuration. As such, for description purposes, only the user terminal A 20 will be described/referenced below.

As described above, the message application server 30 is a cloud server located in cloud 60, and is an example of the information processing apparatus that provides services using a message application 306 (described below). The message application server 30 executes processing associated with exchange of messages, including processing of transmitting and receiving messages and the like to and from the user terminal A 20, and processing of displaying a display screen for transmission and reception of the messages. A mechanism for exchanging messages in the message application 306 will be described below with reference to FIG. 7.

As described above, the tenant server 40 is a cloud server located in cloud 60 and stores and provides each tenant information. The tenant information stored in the tenant server 40 will be described in detail below with reference to FIG. 6.

Figure 2:
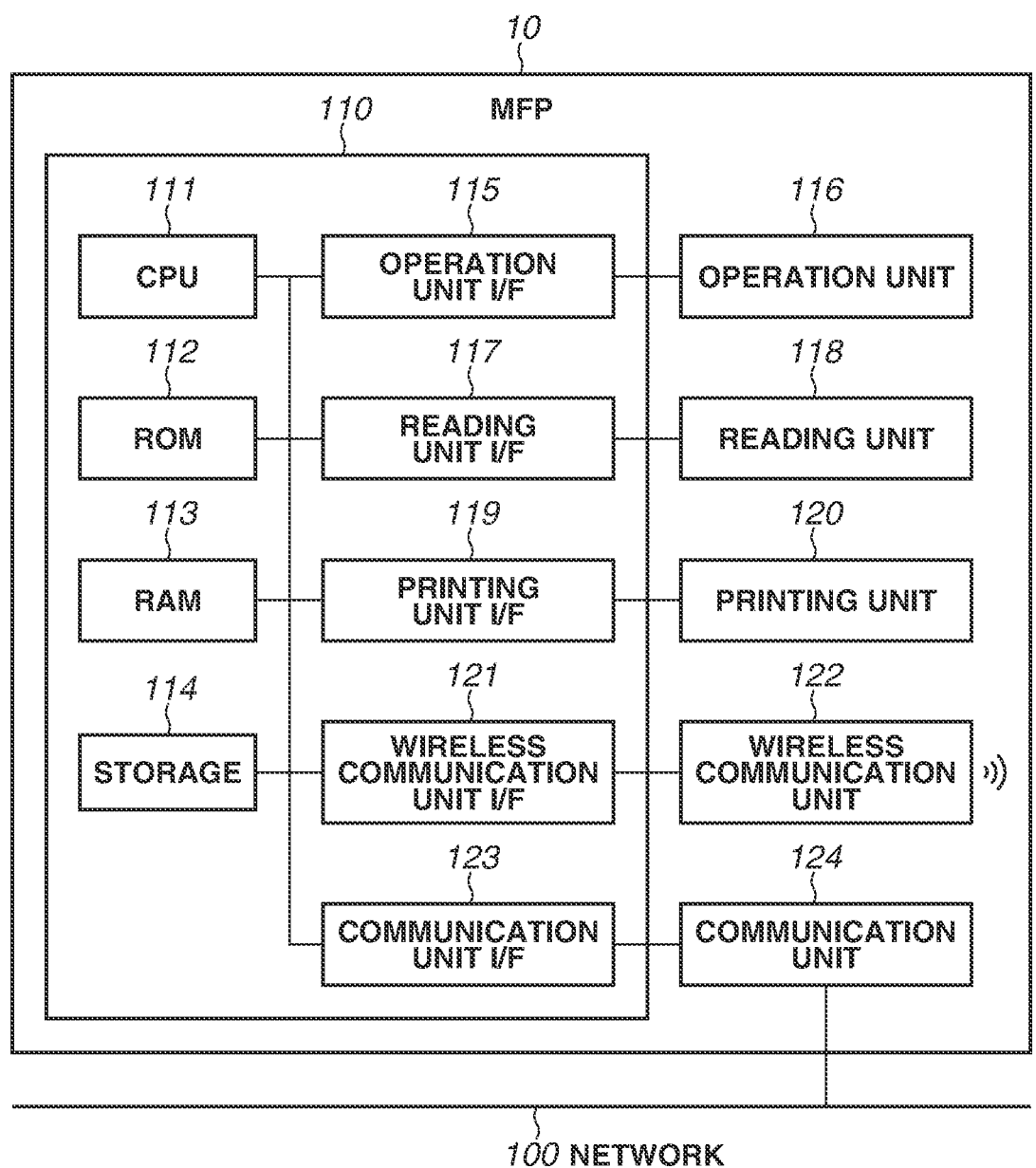
FIG. 2 is a block diagram illustrating a hardware configuration example of a multifunction peripheral (MFP).

FIG. 2 is a block diagram illustrating a hardware configuration example of the MFP A 10. A control unit 110 including a central processing unit (CPU) 111 controls the operation of the MFP A 10. The CPU 111 reads control programs stored in a read-only memory (ROM) 112 or a storage 114 into a random accessary memory (RAM) 113, and performs various types of control such as reading control and printing control. The ROM 112 stores control programs that can be executed by the CPU 111. The ROM 112 also stores a boot program, font data, and the like. The RAM 113 is a main storage and is used as a work area or a temporary storage area for loading various control programs stored in the ROM 112 and the storage 114. The storage 114 stores image data, print data, various programs, various addresses, and various types of setting information. Examples of a medium used as the storage 114 include a solid-state drive (SSD), a hard disc drive (HDD), or an embedded MultiMedia Card (eMMC).

In the present exemplary embodiment, the MFP A 10 executes the process illustrated in each of the flowcharts described below by a single CPU 111 using a single memory (RAM 113). This configuration is not seen to be limiting. In another exemplary embodiment, for example, each process can be executed by a plurality of CPUs, RAMs, ROMs, and storages cooperating with each other. In another exemplary embodiment, some of the processes can be executed using a hardware circuit such as an application specific integrated circuit (ASIC) or a field programmable gate array (FPGA).

An operation unit interface (I/F) 115 connects an operation unit 116 including a display unit such as a touch panel and hardware keys to the control unit 110. The operation unit 116 functions as a display unit that displays information for the user, and also functions as an operation unit that detects an input from the user.

A reading unit I/F 117 connects a reading unit 118, such as a scanner, to the control unit 110. The reading unit 118 reads an image on a document, and the CPU 111 converts the image into image data such as binary data. The image data generated based on the image read by the reading unit 118 is transmitted to an external apparatus, or is printed on a recording sheet.

A printing unit I/F 119 connects a printing unit 120, such as a printer, to the control unit 110. The CPU 111 transfers image data (print data) stored in the RAM 113 to the printing unit 120 via the printing unit I/F 119. The printing unit 120 prints an image based on the transferred image data on a recording sheet fed from a feeding cassette (not illustrated).

A wireless communication unit I/F 121 is an I/F for controlling a wireless communication unit 122, and connects the control unit 110 to an external wireless device via a wireless communication. The user terminal A 20 can be used as the external wireless device.

A communication unit I/F 123 connects the control unit 110 to a network 100. The control unit 110, via the communication unit I/F 123, controls a communication unit 124 to transmit image data and various types of information in the image processing apparatus (MFP A 10) to an external apparatus and to receive print data and information on the network 100 from the information processing apparatus on the network 100. Examples of the transmission and reception method via the network 100 include transmission and reception using an electronic mail (e-mail) and file transmission using other protocols (e.g., a file transfer protocol (FTP), a server message block (SMB) protocol, a Web Distributed Authoring and Versioning (WebDAV) protocol). Additionally, image data and various types of setting data can be transmitted and received over the network 100 by the user terminal 20 and the message application server 30 accessing using HyperText Transfer Protocol (HTTP) communication.

Figure 3:
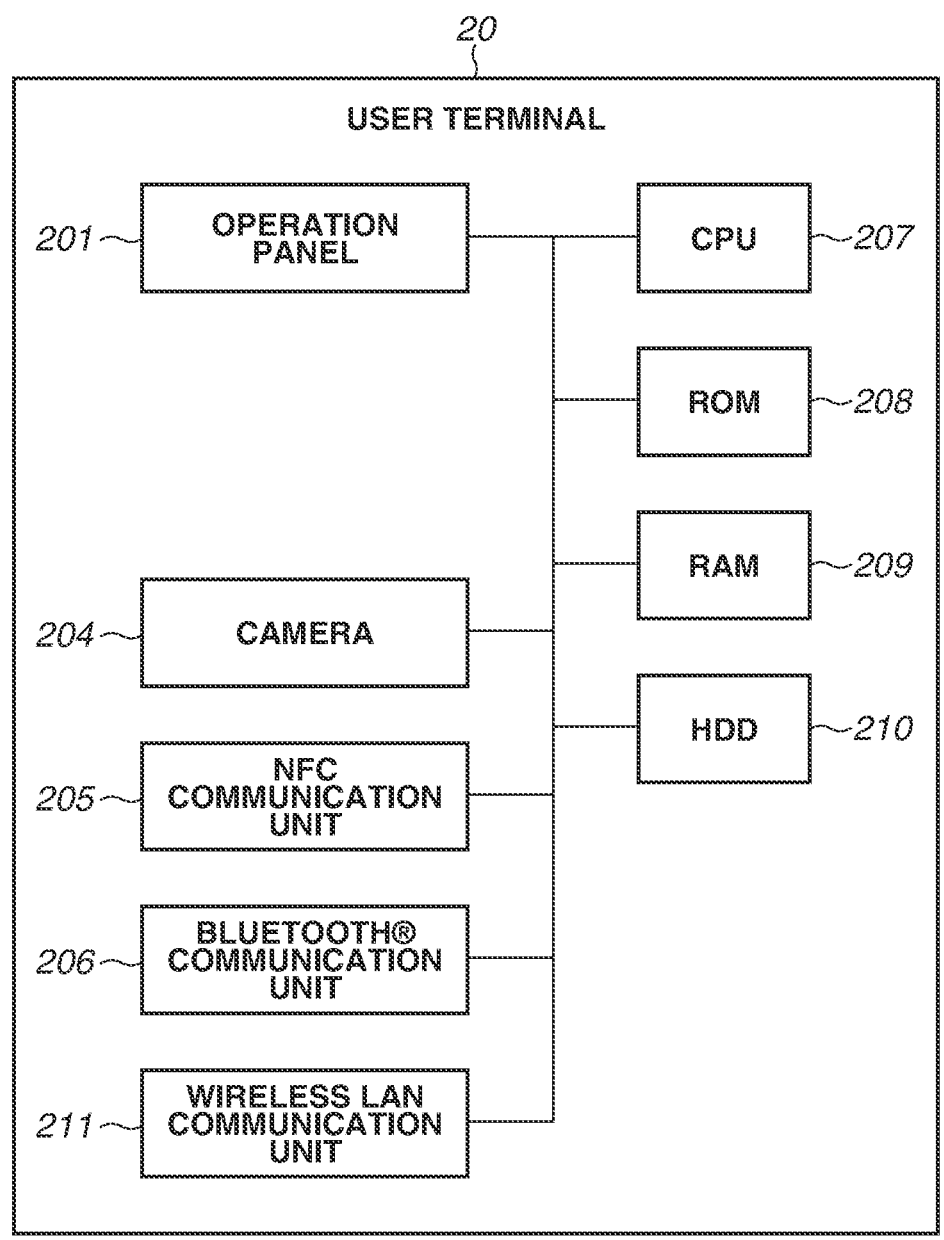
FIG. 3 is a block diagram illustrating a hardware configuration example of a user terminal.

FIG. 3 is a block diagram illustrating a hardware configuration example of the user terminal 20. As described above, the user terminal 20 according to the present exemplary embodiment is assumed to be an apparatus such as a smartphone or a tablet PC. However, this is not seen to be limiting. Any other apparatus can be used as the user terminal 20 as long as the user terminal 20 is an information processing apparatus that can connect to the network 100 via Wi-Fi® communication or the like.

A CPU 207 reads control programs stored in a ROM 208, and executes various types of processing for controlling operation of the user terminal 20. A RAM 209 is a main memory and is used as a temporary storage area such as a work area for the CPU 207. An HDD 210 stores various types of data, such as images and/or electronic documents.

An operation panel 201 includes a touch panel function that can detect a touch operation by the user, and displays various screens provided by an operating system (OS) or an e-mail transmission application. The operation panel 201 is used to check information stored in the message application server 30. The user inputs a touch operation on the operation panel 201 to input a desired operation instruction to the user terminal 20. The user terminal 20 includes hardware keys (not illustrated) that the user can use to input the operation instruction to the user terminal 20.

A camera 204 captures an image in response to an image capturing instruction from the user. The captured image is stored in a predetermined area of the HDD 210. The camera 204 can also be used to obtain an image of a QR Code® to enable the user to acquire information associated with the QR Code®.

The user terminal 20 can exchange data with various peripheral devices via a near-field communication (NFC) communication unit 205, a Bluetooth® communication unit 206, and a wireless LAN communication unit 211.

The Bluetooth® communication unit 206 in the user terminal 20 can support Bluetooth® Low Energy.

Figure 4:
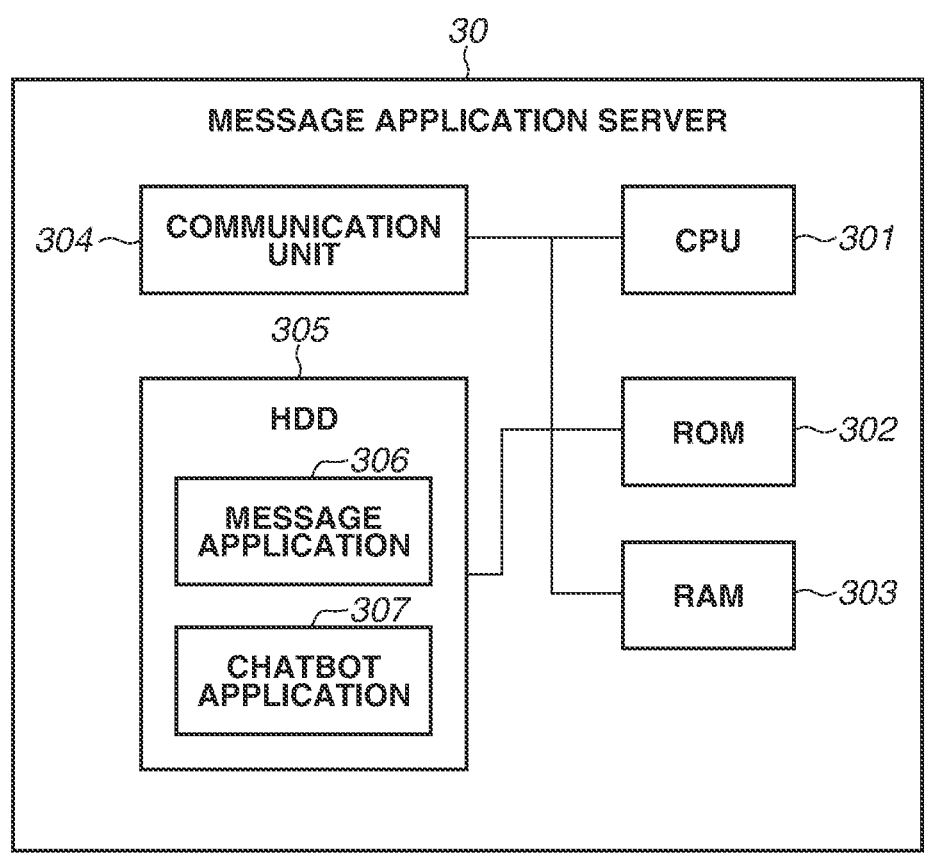
FIG. 4 is a block diagram illustrating a hardware configuration example of a message application server.

FIG. 4 is a block diagram illustrating a hardware configuration example of the message application server 30. A CPU 301 reads a control program stored in a ROM 302 and the message application 306 stored in an HDD 305, and executes various types of processing for controlling operation of the message application server 30.

The ROM 302 stores a control program. A RAM 303 is a main memory and is used as a temporary storage area such as a work area for the CPU 301. The HDD 305 stores various types of data such as a message, an image, channel information, and an application. Data can be exchanged with various devices such as the user terminal 20 and the MFP A 10 via a communication unit 304. The communication unit 304 can establish a wired communication using Ethernet®, or can establish a wireless communication such as Wi-Fi® communication. The message application 306 is installed in the HDD 305 and is executed by the CPU 301. A chatbot application 307 is also installed in the HDD 305.

Figure 5:
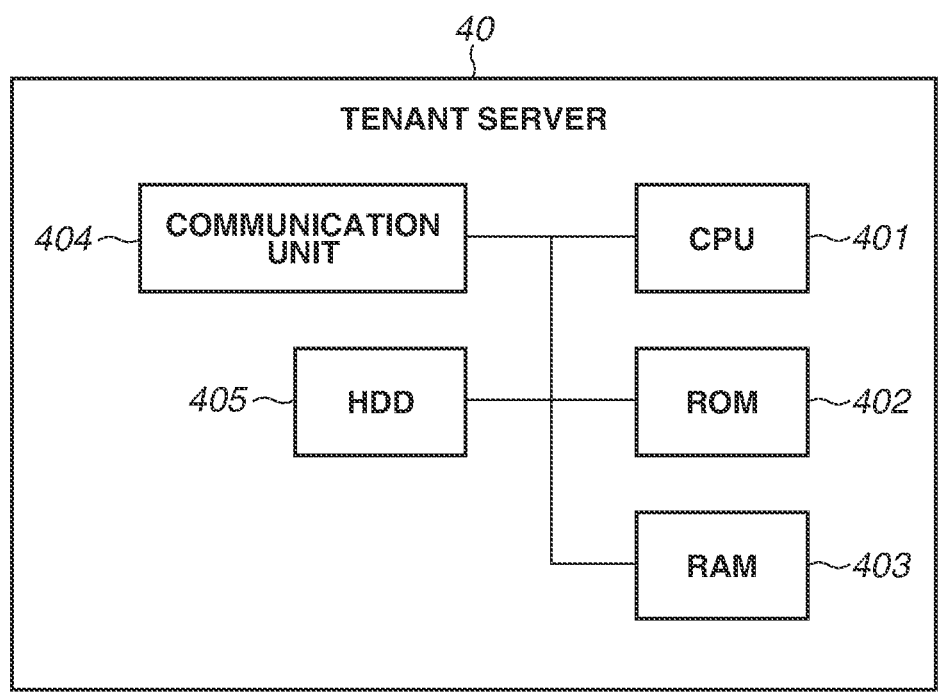
FIG. 5 is a block diagram illustrating a hardware configuration example of a tenant server.

FIG. 5 is a block diagram illustrating a hardware configuration example of the tenant server 40. A CPU 401 reads a control program stored in a ROM 402, and executes various types of processing for controlling tenant information 601. The tenant information 601 to be stored will be described below with respect to FIG. 6. The ROM 402 stores a control program. A RAM 403 is a main memory and is used as a temporary storage area such as a work area for the CPU 401. An HDD 405 stores the tenant information 601 and the like. Data can be exchanged with various devices such as the message application server 30 via a communication unit 404.

Figure 6:
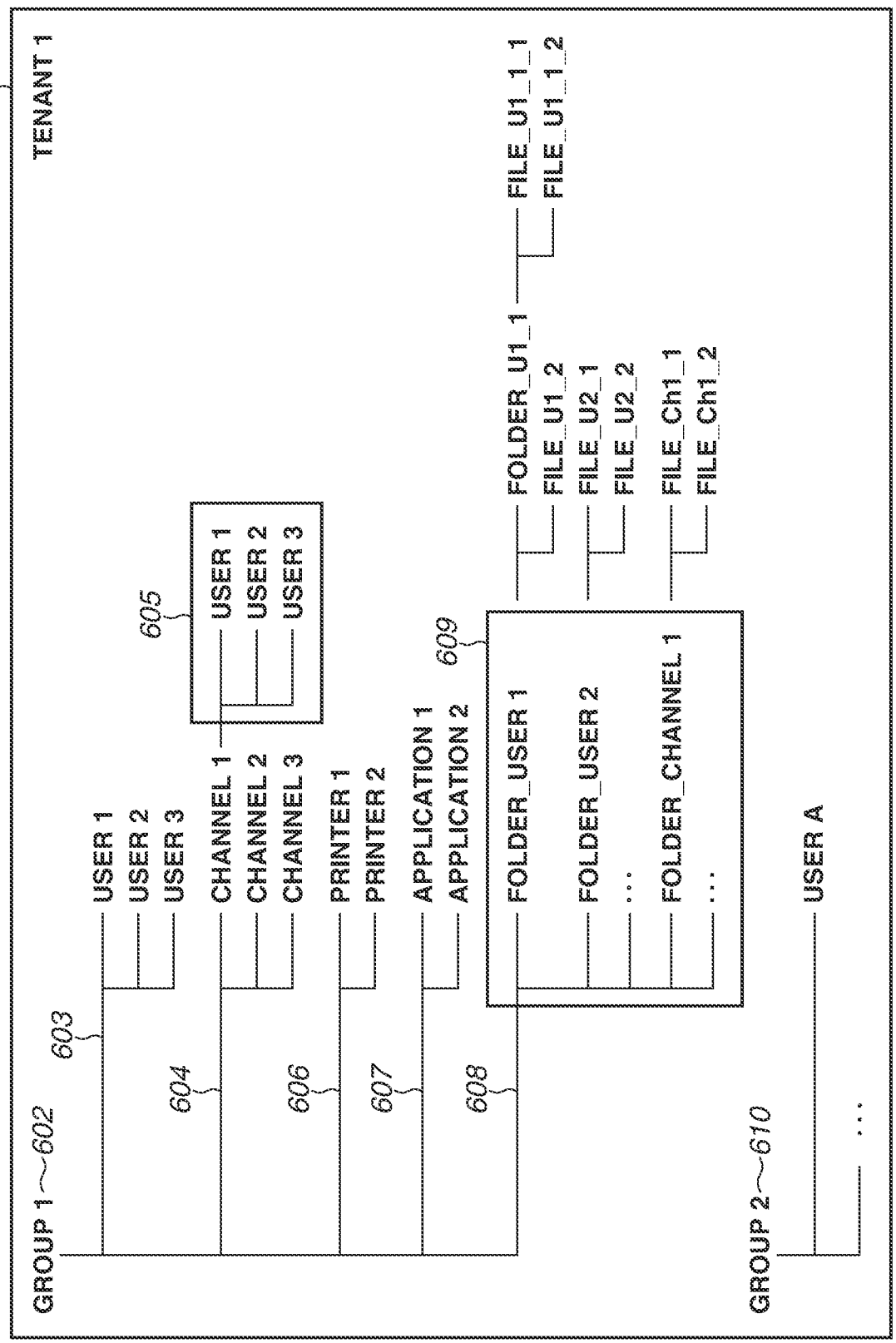
FIG. 6 illustrates an example of tenant information stored in a hard disc drive (HDD) in the tenant server.

FIG. 6 illustrates an example of the tenant information 601 stored in the HDD 405 in the tenant server 40. The tenant information 601 includes one or more pieces of group information. For description purposes, two pieces of group information 602 and 610 are included in the example illustrated in FIG. 6. Depending on the configuration of the message application 306, only one piece of group information can be included in one piece of tenant information. In such a case, the tenant information 601 and the group information are equivalent.

Both the group information 602 and the group information 610 include pieces of information constituting each piece of group information. Specifically, for example, the group information 602 is associated with user information 603, channel information 604, printer information 606, cooperative application information 607, and file information 608.

The user information 603 indicates information about each user belonging to a group. The channel information 604 indicates information for grouping the user information 603, and stores a list 605 of user information corresponding to each channel. Each channel refers to a talk room for exchanging messages among a plurality of associated users.

The printer information 606 indicates information for identifying the MFP A 10. An application that uses the group information 602 can transmit commands, such as a print command, to any MFP by referring to the printer information 606. The printer information 606 can indicate an internet protocol (IP) address or media access control (MAC) address of the MFP, or can indicate an identification (ID) that can uniquely identify the MFP. The ID can be issued by the MFP A 10 when information about the MFP A 10 is registered in the message application server 30. The printer information 606 is associated with the corresponding group. In another exemplary embodiment, the printer information 606 can be associated with a corresponding channel or cooperative application information described below. For example, an application 1 can be associated with the MFP A 10, and an application 2 can be associated with the MFP A 10 and MFP B 11. The printer information 606 can also be associated with the tenant information 601. Specifically, in the case of tenant information 1 illustrated in FIG. 6, printers that are indicated in the printer information 606 and are commonly associated in the tenant information 1 are used.

The cooperative application information 607 indicates information about cooperative applications that cooperate with the message application 306 corresponding to the group information 602. If the chatbot application 307 is associated as a cooperative application to cooperate with the group information 602, information about the chatbot application 307 is stored in the cooperative application information 607.

The file information 608 indicates information about folders and files stored in association with the group information 602. Each folder can store a folder or a file. For example, "folder_U1_1" stores two files, i.e., "file_U1_1_1" and "file_U1_1_2".

The file information 608 stores dedicated folders 609 for all users and channels included in the group information 602. Each dedicated folder is created by the message application 306 with an event such as addition of a user or creation of a channel as a trigger. A user dedicated folder stores a file uploaded by the user, a folder created by the user, a file privately transmitted to another user, and the like. A channel dedicated folder stores a file uploaded to a corresponding channel by the user belonging to the channel, a folder created by the user, and the like.

Examples of the dedicated folders 609 include a "folder_user 1" folder storing folders and files that are privately used by a user 1, and a "folder_channel 1" folder that is shared among users belonging to a channel 1. The user can check the stored files in the corresponding channel, and can download the files to the user terminal 20.

In a case where the message application 306 refers to a user list corresponding to the tenant information 601, the message application 306 refers to the group information 602 stored in the HDD 405 of the tenant server 40 via the communication unit 304, and obtains the list of the user information 603. The same applies for the channel information 604, the printer information 606, the cooperative application information 607, and the file information 608.

Figure 7B:
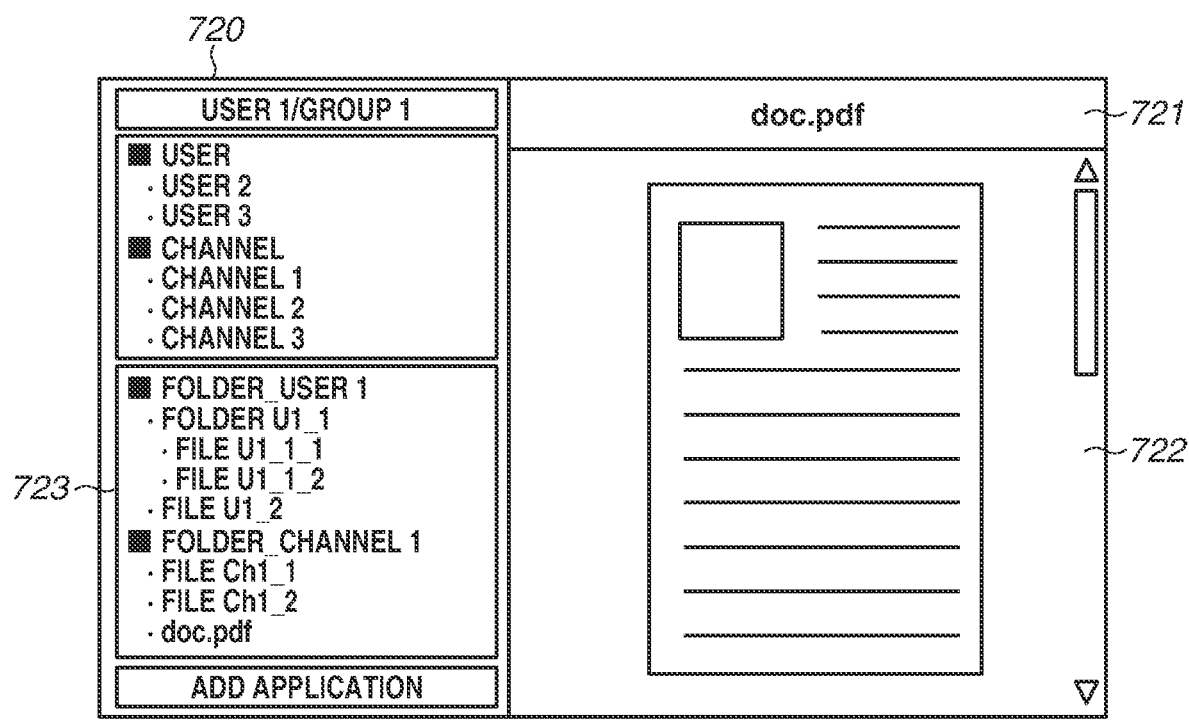

FIGS. 7A and 7B illustrate examples of a screen displayed on the operation panel 201 of the user terminal 20 by the message application 306 cooperating with the chatbot application 307.

A screen 701 is an example of a message screen displayed on the operation panel 201 of the user terminal 20 by the message application 306 corresponding to the group information 602. The example illustrates a case where the users indicated by the user information 603 have accessed the message application 306 associated with the group information 602.

An area 702 displays the user information 603 indicating the user who has accessed the message application server 30 and has received data displayed on the screen 701. The area 702 also displays the group information 602 indicating the group to which the user belongs.

An area 703 displays the user information 603 and channel information 604 corresponding to the group information 602 corresponding to the user 1 who has accessed the message application server 30. The user can select any communication partner from the area 703 and can exchange messages with the selected communication partner. In this case, if the channel information 604 is selected, the user can exchange messages with all members belonging to the channel, as indicated by an area 705. An area 719 displays the folder corresponding to the user 1 who has accessed the message application server 30, and the folders and files corresponding to the channel to which the user 1 belongs.

A button 704 enables adding a cooperative application. When the button 704 is selected, the cooperative application is installed on the message application server 30.

The area 705 displays a talk room. A history of messages received from the communication partner with whom the user is currently exchanging messages is displayed in the area 705. Specifically, a message transmitted from the communication partner selected in the area 703 is displayed on the area 705.

A message 706 indicates a message transmitted by the user 1. Each message can include just characters, or can include information associated with the file information 608. For example, each message can be provided with a link or the like for a file.

A message 707 indicates a message for starting a cooperative application. In the present exemplary embodiment, an example will be described where the chatbot application 307 is installed in the cooperative application information 607. The chatbot application 307 is started with the text "I would like to scan documents" as a trigger, and a screen 711 is then displayed. While in the present exemplary embodiment, the chatbot application 307 is started with text as the trigger, in another exemplary embodiment, the chatbot application 307 can be started by selecting the chatbot application 307 on the area 705 or the like.

The screen 711 is an example of a scan button generation screen displayed on the operation panel 201 of the user terminal 20 by the chatbot application 307.

A window 712 is a window for making a reading setting (scan setting) used in reading processing (scan processing) to read an image on a document and generate image data.

A pull-down menu 713 enables the user to set the size of the document to be read. Reading settings such as file format, density, and double-sided document can be entered via the window 712.

A pull-down menu 714 is a setting item for designating an MFP that executes the reading processing. The pull-down menu 714 displays a list of printer information corresponding to the channel or group in which the chatbot application 307 is started in the tenant information 601. The list of printer information corresponding to the user who has started the chatbot application 307 is displayed. In this example, the MFP A 10 (printer 1) is selected.

A setting field 715 is a field for setting the name of a button. The user can manually input a character string into the setting field 715, or can select a name from among channel names or the like. The button will be described below.

A setting field 716 is a setting field for designating a condition for deleting a button. The setting field 716 enables the user to select a condition for deleting (hiding) a button from among conditions such as "delete after a lapse of time", "delete based on the number of times of execution", and "delete based on the number of buttons". If "delete after a lapse of time" is selected, a button that is set in the window 712 and is registered in the MFP A 10 is deleted (hidden) when a predetermined period of time has elapsed since the registration. The user can input and determine any period as the predetermined period of time. If "delete based on the number of times of execution" is selected, a button that is set in the window 712 and is registered in the MFP A 10 is deleted (hidden) when the button has been selected a predetermined number of times since the registration and the reading processing has been executed the predetermined number of times. The user can input and determine any number as the predetermined number of times. If "delete based on the number of buttons" is selected, a registered button is deleted (hidden) when the number of buttons registered in the MFP A 10 has reached a predetermined number. The user can input and determine any number as the predetermined number.

A button 717 enables transmitting a button registration request to the MFP A 10. If the button 717 is selected, information about settings made in the window 712 and the button registration request are transmitted to the MFP A 10.

Deleting (hiding) a button as described above makes it possible to adjust the number of buttons displayed on the operation unit 116 of the MFP A 10. This addresses difficulties that can occur for the user to select a button due to an increase in the number of buttons being displayed.

A button 718 enables canceling a setting. If the button 718 is selected, the setting made in the window 712 is discarded, and the screen returns to the screen 701.

A screen 720 is a screen displayed on the operation panel 201 of the user terminal 20 by the message application 306 when the user selects "doc.pdf", which is a file uploaded to the channel 1, from an area 723.

A file name of a file selected by the user is displayed in an area 721. In the present exemplary embodiment, the area 721 displays a file name. In another exemplary embodiment, a path where the file is stored can be displayed.

A window 722 is a file display window for displaying a file, and displays "doc.pdf", which is the file selected by the user. The window 722 can provide a display method and a function suitable for the selected file format. For example, if a text file is selected, the window 722 is displayed as a window including a text display function as well as functions for inserting and deleting characters. If the user selects a folder instead of a file in the area 723, a list of folders and files stored in the selected folder is displayed on the file display window 722.

Figure 8:
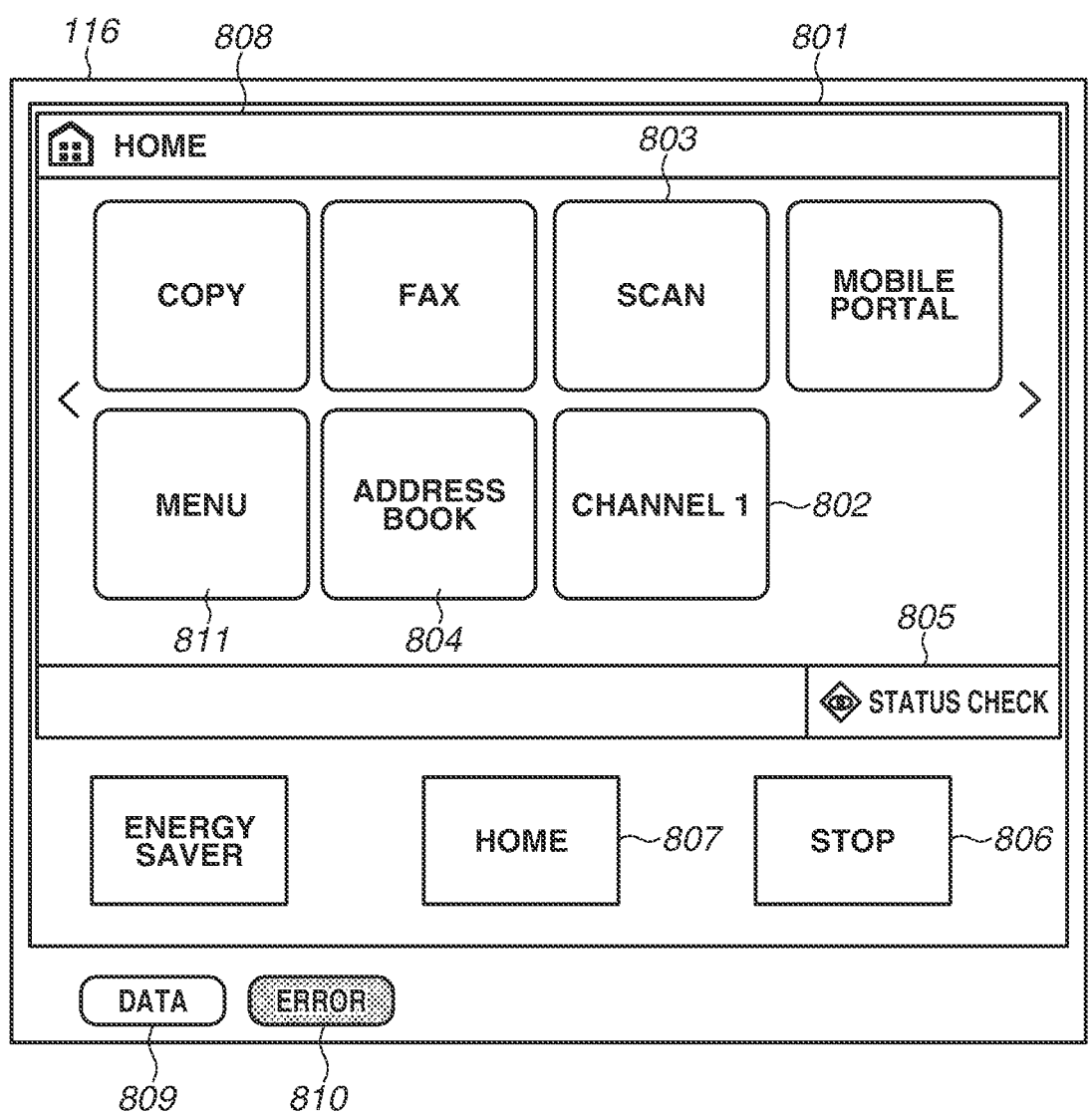
FIG. 8 illustrates an example of a home screen displayed on an operation unit.

FIG. 8 illustrates an example of a home screen 808 displayed on the operation unit 116. The operation unit 116 includes a touch panel 801 for displaying an operation screen and light-emitting diodes (LEDs) 809 and 810.

The touch panel 801 also functions as a reception unit that receives an instruction from the user as a touch panel. The user directly touches a screen displayed on the touch panel 801 with the user's finger or an object such as a stylus to provide an instruction to execute each function based on the displayed screen. The home screen 808 is an initial screen for providing an instruction to execute each function of the MFP A 10 and for selecting a screen display to make various settings for functions to be executed by the MFP A 10, such as copy, facsimile (fax), scan, and media print.

A status check button 805 is a button for displaying a screen (status check screen) to check the state of the MFP A 10. The status check screen enables display of a transmission history and the like. The term "button" used herein refers to a demarcated region in a display area on the touch panel, and a touch on the demarcated region refers to a selection of the button.

A button 802 is a scan execution button corresponding to the channel 1 created when the button 717 is selected. If the condition in the setting field 716 is satisfied, the button 802 is deleted. In other words, the button 802 on the home screen 808 is hidden. Setting information stored in association with the button 802 is also deleted.

A button 803 is a "Scan" button for displaying a scan selection screen (not illustrated) from the MFP A 10. The scan selection screen is a screen on which a transmission method such as e-mail transmission, file transmission by SMB, FTP, or HTTP, or Internet fax (I-fax) transmission is selected and displayed. Each transmission setting screen is displayed by the user touching a displayed selection display screen.

A button 804 is an "Address Book" button for displaying an address book screen for the MFP A 10.

The LEDs 809 and 810 are LEDs that notify the user of the state of the MFP A 10.

The LED 809 remains on while an e-mail is being received or a print job is being executed. The LED 810 turns on if an error has occurred in the MFP A 10.

A button 806 is a "Stop" button that, when selected, results in cancellation of various operations and is a resident key that is constantly displayed on the operation unit 116.

A button 807 is a "Home" button that, when selected, results in displaying the home screen 808, and is a resident key that is constantly displayed on the operation unit 116.

A button 811 is a "Menu" button for displaying a screen (not illustrated) to make environmental settings such as a used language, as well as settings for each function.

FIG. 9 is a sequence diagram illustrating an example of scan processing and path notification processing. According to the present exemplary embodiment, each operation (step) of the MFP A 10 in FIG. 9 is executed by the CPU 111 loading a control program stored in the ROM 112 or the storage 114 into the RAM 113 and executing the control program.

In step S901, the user issues a scan execution instruction, and the user terminal 20, after receiving the scan execution instruction, transmits the scan execution instruction to the message application server 30. The chatbot application 307, based on the scan execution instruction, can be started with a chat text in the message 707 as a trigger, or can be started by selecting the chatbot application 307.

In step S902, the CPU 301 of the message application server 30 sends a printer information acquisition request to the tenant server 40.

In step S903, the CPU 401 of the tenant server 40 transmits the printer information 606 to the message application server 30.

In step S904, the CPU 301 of the message application server 30 starts the chatbot application 307, which results in the window 712 being displayed on the user terminal 20.

In step S905, the user terminal 20 receives input of the scan setting displayed on the window 712. In step S906, upon selection of the button 717, the user terminal 20 transmits the input scan setting to the message application server 30.

In step S907, the CPU 301 of the message application server 30 generates scan button generation information based on the data received in step S906, and transmits the generated scan button generation information to the MFP A 10. The scan button generation information includes a uniform resource locator (URL) of a destination of image data generated by scanning. In other words, the scan button generation information includes a URL for the MFP A 10 to access the message application server 30.

In step S908, the CPU 111 generates the scan execution button 802 based on the received scan button generation information.

In step S909, the user selects the scan execution button 802. Selection of the scan execution button 802 by the user initiates the chatbot application 307 to start monitoring the scan job status of the MFP A 10. In step S910, the CPU 111 executes scanning of a document based on the scan setting received in step S907.

In step S911, the CPU 111 of the MFP A 10 transmits each scanned image to the message application server 30 based on the URL of the destination received in step S907.

In step S912, the message application server 30 executes the chatbot application 307, thereby storing the received image data in the HDD 305 and counting the number of files of the transmitted scanned images. In the present exemplary embodiment, images are stored in the message application server 30. In other exemplary embodiment, images can be stored in, for example, a cooperating storage server (not illustrated). A name preliminarily set by the user in the MFP A 10 can, for example, be used as a file name of each scanned image. In another exemplary embodiment, the file name of each scanned image can be an automatically given name that combines a date and a unique number not used for other files, such as "20210520_0001.pdf".

In step S913, the message application server 30, upon detection of completion of a scan job, executes the chatbot application 307, thereby acquiring the number of pieces of image data transmitted from the MFP A 10. The number of pieces of image data can be acquired by counting the number of pieces of image data received in step S912, or can be acquired from the scan job status of the MFP A 10. When the message application server 30 executes the chatbot application 307 and determines that a plurality of pieces of image data is transmitted, the message application server 30 creates a new folder and stores the image data in the newly created folder. A name of each created folder can be, for example, a combination of a function name and a unique number not used for other folders, such as "SCAN0001", or a combination of a date and a unique number not used for other folders, such as "20210520_0001".

The folder name can be freely determined by the user. In such a case, the user can input the folder name on the MFP A 10, or can input the folder name in the window 712.

In step S914, the message application server 30 executes the chatbot application 307 to provide the user with a message indicating a URL or link of the folder in which the image data is stored.

In the present exemplary embodiment, the processing of determining whether to create a folder and creating a folder in step S913 and the processing of providing a notification to the user in step S914 are executed by the chatbot application 307. In another exemplary embodiment, the processing can be executed by the MFP A 10.

FIG. 10 is a flowchart illustrating an example of folder path notification processing. The flowchart is started when the message application server 30 executes the chatbot application 307 and detects completion of a scan job by the MFP A 10.

In step S1001, the message application server 30 executes the chatbot application 307, thereby determining whether the message application server 30 has received a plurality of pieces of image data from the MFP A 10. If it is determined that a plurality of pieces of image data is received (YES in step S1001), the processing proceeds to step S1002. If it is determined that only one piece of image data is received (NO in step S1001), the processing proceeds to step S1004. In another exemplary embodiment, the determination can be skipped, and the processing can always proceed to step S1002. In other words, a folder can be created regardless of the number of pieces of image data received from the MFP A 10.

In step S1002, the message application server 30 executes the chatbot application 307 to create a folder on the message application 306.

Specifically, the folder to be created is displayed in the area 719, and is managed and provided by the message application server 30. The created folder can be referred to on the message application 306. The name of the created folder can be set via the window 712, or can be set via the operation unit 116 of the MFP A 10. If the folder name is set via the operation unit 116 of the MFP A 10, the message application server 30 receives information indicating the folder name from the MFP A 10.

While the present exemplary embodiment illustrates an example where the received image data is stored in a newly created folder, this is not seen to be limiting. In another exemplary embodiment, for example, if there is already a folder with a folder name designated by the user, the image data can be stored in the existing folder without generating a new folder. In another exemplary embodiment, if there is no folder with a folder name designated by the user, a new folder can be created, and the image data can be stored in the newly created folder.

In step S1003, the message application server 30 executes the chatbot application 307 to store the image data received from the MFP A 10 in the folder created in step S1002.

In step S1004, the message application server 30 executes the chatbot application 307 to acquire a URL to be notified to the user. Specifically, if the plurality of pieces of image data is received from the MFP A 10, a URL used to refer to a folder in which the plurality of pieces of image data is stored is acquired. In this case, any information can be acquired as long as the information can identify a folder that is a storage location, such as a path for referring to the folder. If one piece of image data is received from the MFP A 10, a URL used to refer to the image data is acquired. The information acquired in this case can also be any information, such as a file path, as long as the information can identify and refer to the image data.

In step S1005, the message application server 30 executes the chatbot application 307 to transmit a message including the URL acquired in step S1004 to the channel that is the destination. In another exemplary embodiment, the destination of the message can be the user who issued a scan button generation instruction.

FIGS. 11A and 11B illustrate screens displayed on the operation panel 201 of the user terminal 20 by the message application 306 when a notification about a URL is provided.

A message 1101 is a message sent when it is determined that only one piece of image data is received in step S1001. The message 1101 includes a message indicating that the image data transmitted from the MFP A 10 is stored, and a file name 1102 of the stored image data. The file name 1102 functions as a link associated with the URL used to refer to the image data. The link enables the user to select the image data by performing an operation such as clicking or tapping the link. The image data can be displayed by selecting the file name 1102 as well as by selecting any location within the message area of the message 1101.

A URL can be used instead of a file name as a character string displayed as the link in the message 1101.

An image 1103 is an image displayed in a case where the user selects the file name 1102 and accesses the URL associated with the file name 1102, and is based on the image data received from the MFP A 10. The image 1103 can be displayed by an image display application or the like installed in the user terminal 20, or can be displayed by the message application 306.

As described above, when image data is uploaded, an icon or message for each image data is displayed in the talk room. When the user who is referring to the talk room selects the icon or a link, the image corresponding to the selected icon or link is displayed or downloaded.

If the image processing apparatus transmits a plurality of pieces of image data to a chat server and uploads the image data to the talk room, a plurality of icons or links corresponding to the plurality of pieces of image data, respectively, is displayed in the talk room. Accordingly, the number of icons or links to be displayed increases as the number of pieces of image data to be shared increases, which could make it difficult for the user to refer to messages exchanged in the talk room.

To address any difficulties, if a plurality of pieces of image data is received in step S1004, the plurality of pieces of image data is stored in a folder, and only an icon or link corresponding to the folder in which the plurality of pieces of image data is stored is displayed in the talk room (channel). This enhances the user's experience with respect to referring to messages exchanged in the talk room.

A message 1104 is a message sent when it is determined that a plurality of pieces of image data is received in step S1001. The message 1104 includes a message indicating that the plurality of pieces of image data received from the MFP A 10 is stored in a folder, and a folder name 1105 of the folder in which the plurality of pieces of image data is stored. The folder name 1105 functions as a link associated with the URL used to access the folder. A list of scanned images in the folder can be displayed by selecting the folder name 1105 as well as by selecting any location within the message area of the message 1104. A URL can be used instead of a folder name as a character string displayed as the link in the message 1104.

A list 1106 is a list of data that is stored in the folder indicated by the URL associated with the folder name 1105, and is displayed by the message application 306 when the user selects the folder name 1105. In the list 1106, a data file name, a file size, and the like are displayed. The user can refer to selected data by selecting data in the list 1106. For example, when image data included in the list 1106 is selected, an image based on the selected image data, such as the image 1103, is displayed. The list of data can be displayed by a file management application or the like installed in the user terminal 20. As described above, the list of data is displayed such that the user can select data stored in the storage location by selecting the corresponding URL.

The execution of the above-described processing enables the user to easily refer to a folder in which image data transmitted from the image processing apparatus is stored.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2021-134623, filed Aug. 20, 2021, which is hereby incorporated by reference herein in its entirety.

What is claimed is:

1. An information processing apparatus communicating with an image processing apparatus and providing a chat service, the information processing apparatus comprising:
   a communicator receiving, from the image processing apparatus, one or more image files generated, based on reading one or more documents, by the image processing apparatus; and
   a controller,
   wherein the controller stores the one or more image files received by the communicator in a folder,
   wherein, in a case where the number of the one or more image files received by the communicator is less than or equal to a predetermined number, the predetermined number being more than or equal to 2, the controller posts one or more objects corresponding to each of the one or more image files in a talk room of the chat service, the one or more objects being objects for displaying an image indicated by an image file corresponding to a selected object upon being selected; and
   wherein, in a case where the number of the one or more image files received by the communicator is more than the predetermined number, the controller posts another object in the talk room of the chat service, the other object being an object for displaying a list of files stored in the folder upon being selected.

2. The information processing apparatus according to claim 1, wherein the talk room in which the one or more objects are posted is set by a user before the controller stores the one or more image files in the folder.

3. The information processing apparatus according to claim 1, wherein the folder is a folder provided by the chat service.

4. The information processing apparatus according to claim 1,
   wherein the controller acquires, from the image processing apparatus, information for identifying the folder where the one or more image files received by the communicator are to be stored, and
   wherein the acquired information is a uniform resource locator (URL).

5. A non-transitory computer-readable storage medium storing a program that, when executed by an information processing apparatus communicating with an image processing apparatus and providing a chat service, causes the information processing apparatus to perform a method, the method comprising:
   receiving, from the image processing apparatus, one or more image files generated, based on reading of one or more documents, by the image processing apparatus; and
   storing the received one or more image files in a folder;
   in a case where the number of the received one or more image files is less than or equal to a predetermined number, the predetermined number being more than or equal to 2, posting one or more objects corresponding to each of the received one or more image files in a talk room of the chat service, the one or more objects being objects for displaying an image indicated by an image file corresponding to a selected object upon being selected; and
   in a case where the number of the received one or more image files is more than the predetermined number, posting another object in the talk room of the chat service, the other object being an object for displaying a list of files stored in the folder upon being selected.

6. The non-transitory computer-readable storage medium according to claim 5, wherein the talk room in which the one or more objects are posted is set by a user before the one or more image files are stored in the folder.

7. The non-transitory computer-readable storage medium according to claim 5, wherein the folder is a folder provided by the chat service.

8. The non-transitory computer-readable storage medium according to claim 5, the method further comprising:
   acquiring, from the image processing apparatus, information for identifying the folder where the received one or more image files are to be stored,
   wherein the acquired information is a URL.

9. A method for controlling an information processing apparatus communicating with an image processing apparatus and providing a chat service, the method comprising:
   receiving, from the image processing apparatus, one or more image files generated, based on reading of one or more documents, by the image processing apparatus;
   storing the received one or more image files in a folder;
   in a case where the number of the received one or more image files is less than or equal to a predetermined number, the predetermined number being more than or equal to 2, posting one or more objects corresponding to each of the received one or more image files in a talk room of the chat service, the one or more objects being objects for displaying an image indicated by an image file corresponding to a selected object upon being selected; and
   in a case where the number of the received one or more image files is more than the predetermined number, posting another object in the talk room of the chat service, the other object being an object for displaying a list of files stored in the folder upon being selected.

* * * * *